（12）United States Patent
Kondo

(10) Patent No.: US 7,225,687 B2
(45) Date of Patent: Jun. 5, 2007

(54) POWER STEERING APPARATUS AND TORQUE SENSOR

(75) Inventor: Yoshimori Kondo, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 11/072,396

(22) Filed: Mar. 7, 2005

(65) Prior Publication Data

US 2005/0193835 A1 Sep. 8, 2005

(30) Foreign Application Priority Data

Mar. 8, 2004 (JP) ............................. 2004-063286

(51) Int. Cl.
*G01L 3/00* (2006.01)
(52) U.S. Cl. ..................... 73/862.331; 73/862.332
(58) Field of Classification Search ............ 73/862.331, 73/862.332–862.337
See application file for complete search history.

(56) References Cited

U.S. PATENT DOCUMENTS 5,046,372 A * 9/1991 Taniguchi et al. ..... 73/862.335
5,585,571 A * 12/1996 Lonsdale et al. ...... 73/862.325

FOREIGN PATENT DOCUMENTS

JP 2000146722 A * 5/2000
JP 2003-307460 A 10/2003

* cited by examiner

*Primary Examiner*—Edward Lefkowitz
*Assistant Examiner*—Jermaine Jenkins
(74) *Attorney, Agent, or Firm*—Sughrue Mion, PLLC

(57) ABSTRACT

Power steering apparatus includes input and output shafts connected by a torsion bar; and a coil unit disposed around one of the shafts and arranged to sense torque between the input and output shafts. A housing includes an axial bore in which the shafts and coil unit are installed. The housing is further formed with an insertion opening which extends radially into the axial bore and which is sized to allow insertion of the coil unit radially into the axial bore.

18 Claims, 8 Drawing Sheets

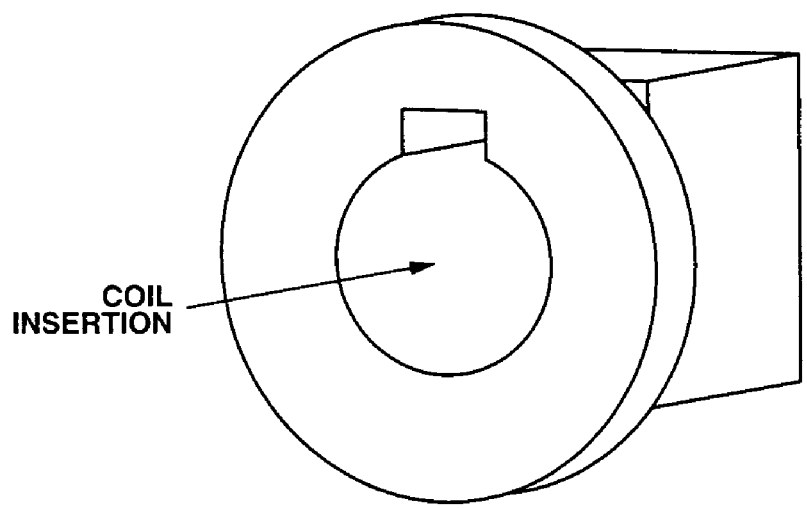
FIG.8A
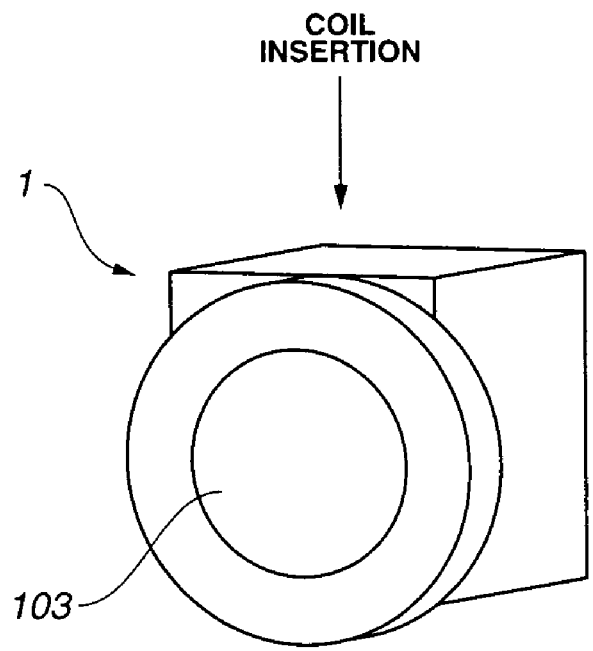
FIG.8B
FIG.10
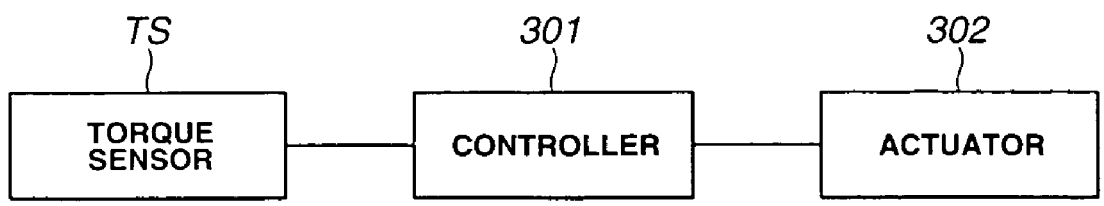

POWER STEERING APPARATUS AND TORQUE SENSOR

BACKGROUND OF THE INVENTION

The present invention relates to power steering apparatus and/or torque sensor for sensing torque from relative rotational displacement between first and second shafts.

A Published Japanese Patent Application Publication No. 2003-307460 shows a vehicle's power steering system including a housing enclosing input and output shafts and a coil unit. A housing of this power steering system is composed of first and second housing members axially joined end to end. A coil unit is inserted axially into the housing from an opening formed in the end of one housing member joined to the other housing member.

SUMMARY OF THE INVENTION

In general, a coil unit has a terminal portion for electrical connection with a circuit of a torque sensor. The terminal portion projects radially outwards from the coil unit, and hence tends to hamper an assembly operation to insert the coil unit into the housing. If the opening size is increased to facilitate the axial insertion of the coil unit with the terminal portion into the housing, then the size of the entire mechanism is increased.

It is an object of the present invention to provide power steering apparatus or torque sensor advantageous for assembly operation and size reduction.

According to one aspect of the present invention, a power steering apparatus comprises: a rotational shaft including an input shaft, and an output shaft connected with the input shaft by a torsion bar; a coil unit including a coil surrounding the rotational shaft, and a terminal portion projecting radially outward from the coil to make electrical connection; an impedance varying member to vary impedance of the coil in accordance with torque of the rotational shaft; a torque sensing circuit connected with the terminal portion, to sense the torque of the rotational shaft in accordance with the impedance of the coil; and a housing enclosing the rotational shaft, the coil unit and the impedance varying member, and including an axial bore containing the rotational shaft, and an insertion opening which extends radially into the axial bore and which is sized to allow insertion of the coil unit radially into the axial bore.

The power steering apparatus may further comprises an actuator for producing a steering assist force, and a controller for controlling the actuator in accordance with the sensed steering torque.

According to another aspect of the invention, a torque sensor comprises: a rotational shaft including an input shaft, and an output shaft connected with the input shaft by a torsion bar; at least one coil unit including a cylindrical portion including a coil surrounding the rotational shaft, and a terminal portion which projects radially outward from the cylindrical portion, a torque sensing section electrically connected with the coil through the terminal portion; and a housing including an axial bore containing the rotational shaft and the coil unit, and an insertion opening which extends radially into the axial bore and which is sized to allow insertion of the coil unit radially into the axial bore.

BRIEF DESCRIPTION OF THE DRAWINGS

FIGS. 8A and 8B are perspective views for comparing a coil unit inserting operation in the power steering apparatus according to the first embodiment, with that in the conventional apparatus.

FIG. 10 is a block diagram showing a control system employed in the power steering system of FIG. 1 or FIG. 9.

DETAILED DESCRIPTION OF THE INVENTION

Figure 1:
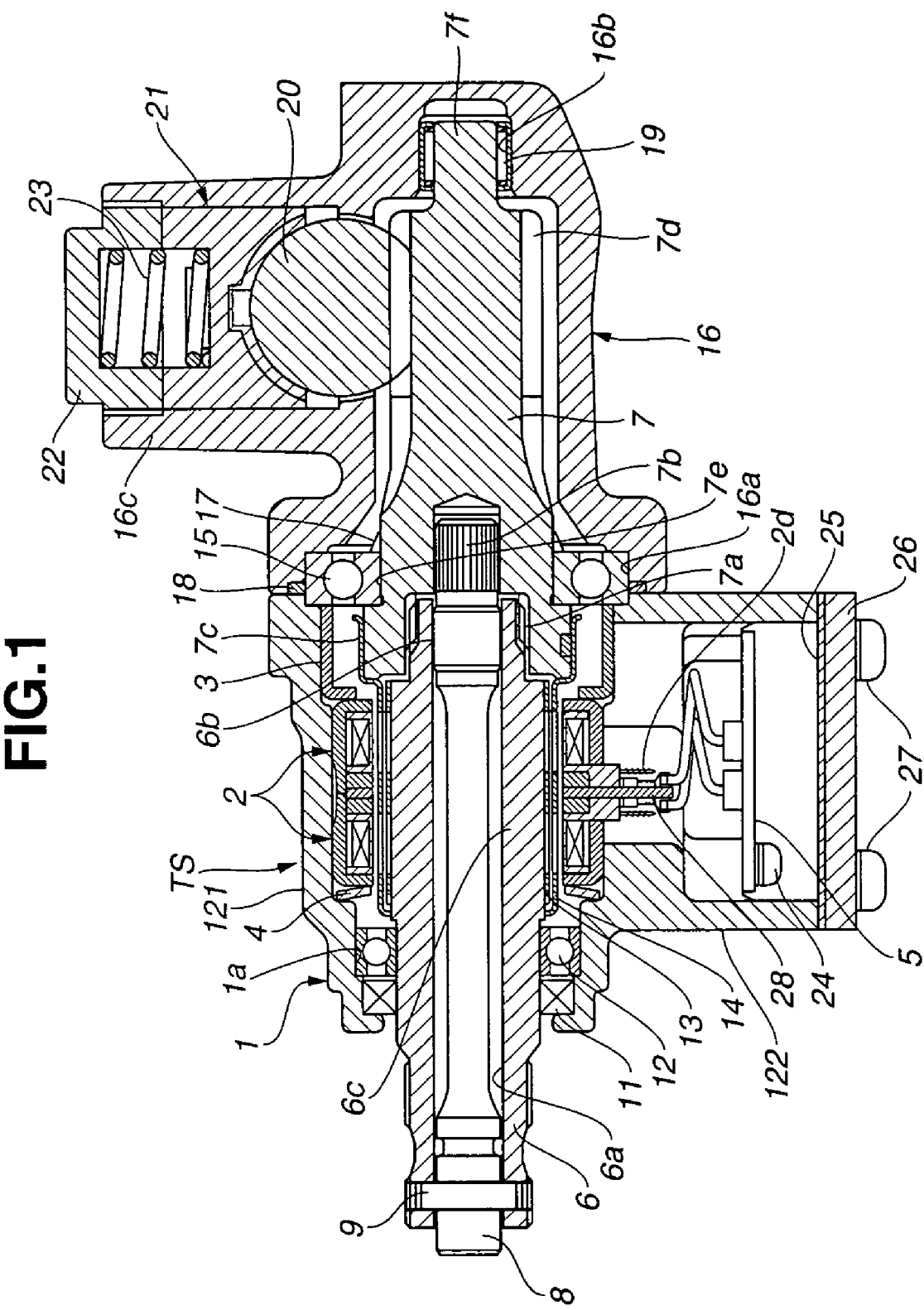
FIG. 1 is a sectional view showing an electric power steering apparatus according to one embodiment of the present invention.

FIG. 1 shows, in section, a torque sensor provided in power steering apparatus or system according to one embodiment of the present invention.

The power steering apparatus shown in FIG. 1 includes an input shaft 6 to be connected with a steering wheel, an output shaft 7 connected with a steering gear for steering steerable wheels of a vehicle, and a torque sensor TS provided between the input and output shafts 6 and 7. The input and output shafts 6 and 7 are connected by a torsion bar 8, to form a rotational shaft for transmitting rotation from the steering wheel to the steering gear. In this example, the steering gear is a rack and pinion mechanism.

A housing encloses torque sensor TS, and input and output shafts 6 and 7. In the example shown in FIG. 1, the housing is composed of a first housing member or sensor housing 1 and a second housing member or rack and pinion housing 16 which are joined together into the single housing. Input shaft 6 is a hollow shaft having an axially extending center through hole 6a in which the torsion bar 8 is received. Near a first end of input shaft 6 on the steering wheel's side, there is provided a pin 9 fixing torsion bar 8 to input shaft 6.

First housing member 1 includes a first housing portion or cylindrical portion 121 defining an axial bore in which input shaft 6 is received. The first housing portion 121 includes a first support portion 1a supporting input shaft 6 through a first bearing 12. Input shaft 6 includes a thick wall portion or larger diameter portion 6c on which an inner ring 13 is mounted, and a sliding portion 6b rotatably mounted on torsion bar 8. In this example, the sliding portion 6b is located near a second end of input shaft 6 on the output shaft's side. Input shaft 6 is made of magnetic material and adapted to produce magnetic field with a coil.

Output shaft 7 extends axially from a first end (right end as viewed in FIG. 1) to a second end (left end in FIG. 1) whereas input shaft 6 extends axially from the first end (left end in FIG. 1) closer to the steering wheel, to the second end toward output shaft 7. Output shaft 7 has a bottomed hole opening in the second (left) end of output shaft 7, and including a larger hole portion 7a for receiving input shaft 6 and a smaller hole portion 7b for receiving torsion bar 8. The larger hole portion 7a receives the second (right) end of input shaft 6 and servers as a fail stopper portion to limit relative rotation of input shaft 6 relative to output shaft 7, to a predetermined angle. The smaller hole portion 7b receives the right end of torsion bar 8, and engages with the right end of torsion bar 8 by serration. Furthermore, output shaft 8 includes an outer ring support portion 7c which is an outer circumference portion near the second end of output shaft 8, a pinion 7d, a second bearing support portion 7e supporting a second bearing 15, and a third bearing support portion 7f supporting a third bearing 19 for supporting the first (right) end of output shaft 7. Output shaft 7 is supported rotatably in second housing member 16 through second and third bearings 15 and 19 on both sides of pinion 7d.

Pinion 7d of output shaft 7 is engaged with a rack shaft 20 in a state urged by a retainer assembly 21. This retainer assembly 21 includes an adjust plug 22 and a spring 23. Adjust plug 22 is arranged to adjust a contact position between pinion 7d and rack shaft 20. Rotation about the axis of output shaft 7 is converted to movement in an axial direction of rack shaft 20 by pinion 7d, to attain a desired steer angle of the vehicle.

Torque sensor TS includes at least one coil unit 2 having a radially projecting terminal portion 2d, and an impedance varying member for varying the impedance of the coil unit. In the example shown in FIG. 1, there are provided two coil units 2 (first coil unit and second coil unit), and the impedance varying member is composed of an inner ring 13 rotating as a unit with input shaft 6, and an outer ring 14 rotating as a unit with output shaft 7. Each of the inner and outer rings 13 and 14 is made of electric conductive and non-magnetic material, and formed with a plurality of small windows arranged in the axial direction and in the circumferential direction. In this example, each of the inner and outer rings 13 and 14 is made of aluminum material including aluminum and aluminum alloy.

The coil units 2 are enclosed in sensor housing 1, and urged toward the output side (rightward as viewed in FIG. 1) by a resilient member 4 on the input (left) side. Coil units 2 are held by a cylindrical holder 3 forcibly fit in the axial bore of sensor housing 1 from the output (right) side. Cylindrical holder 3 determines the axial position of the coil units 2 while preventing undesired movement.

Figure 2:
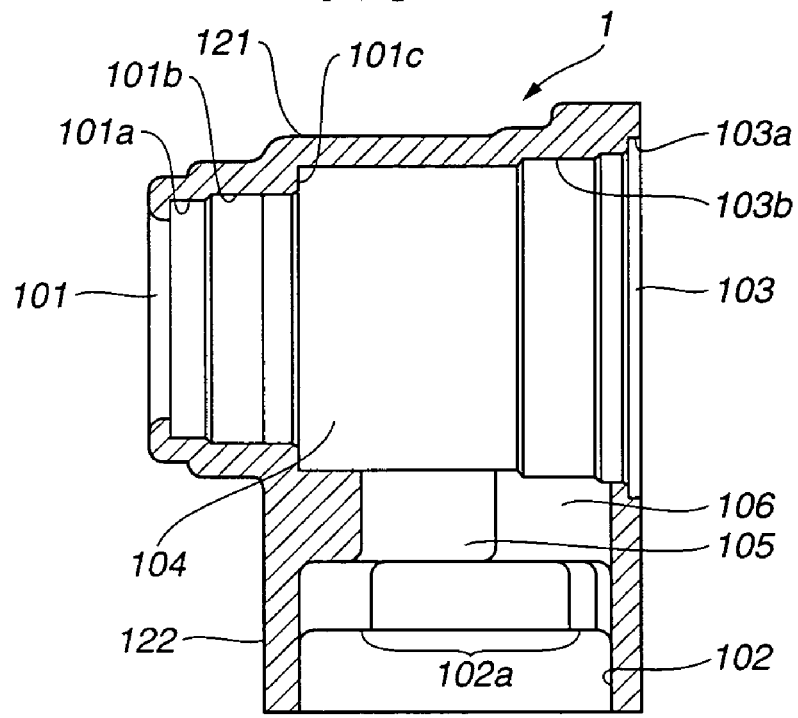
FIG. 2 is a sectional view showing a first housing member of the power steering apparatus of FIG. 1.

Sensor housing 1 includes a second housing portion or projecting portion 122 projecting radially outwards from the first housing portion or cylindrical housing portion 121, and including a cavity or insertion opening 102 (as shown in FIG. 2). A torque sensor substrate 5 including a torque sensing circuit is fixed, by screw fasteners 24, to sensor housing 1 within the inside of projecting portion 122. Torque sensor substrate 5 is located on a radial outer side of terminal portions 2d of first and second coil units 2. Terminal portions 2d of coil units 2 extend radially outward from the cylindrical portions of control units 2, toward the torque sensor substrate 5. A cover 26 is fixed to the second housing portion 122 of sensor housing 1 through a gasket 25 by screw fasteners 27 to cover the hollow inside of the projecting second housing portion 122.

When the steering wheel is turned by a driver, the torsion bar 8 is twisted between input and output shafts 6 and 7. Accordingly, the inner and outer rings 13 and 14 rotate relative to each other and vary the amount of overlap between the windows of inner and outer rings 13 and 14 thereby to vary the impedance of each coil unit 2. The torque sensing circuit determines a steering torque by sensing the variation of the impedance. As shown in FIG. 10, a controller 301 receives the thus-sensed steering torque from the torque sensor TS, and produces a control signal to an actuator 302 in accordance with the sensed steering torque to control a steering assist torque produced by the actuator 302 to reduce the required steering effort to be produced by the driver. In this example, the actuator 302 is an electric motor, and the controller 301 controls the driving current supplied to the motor.

First housing member or sensor housing 1 and second housing member or rack and pinion housing 16 are joined together through an O ring 18. First housing portion 201 of first housing member 1 extends axially from a first end (left end as viewed in FIG. 1) to a second end (right end as viewed in FIG. 1) toward second housing member 16. Second housing member 16 extends axially from a first end (right end as viewed in FIG. 1) to a second end (left end as viewed in FIG. 1) which is joined with the second (right) end of first housing portion 201 of first housing member 1 with the interposition of O ring 18. In the example of FIG. 1, second housing member 16 has an axial bore which is closed at the first (right) end and which is open at the second (left) end toward the first housing member 1. Second housing member 16 includes a first support portion 16a for supporting output shaft 7 at a position near the second (left) end of output shaft 7, through the second bearing 15. An outer race of second bearing 15 is fit in the first support portion 16a.

Near the first (right) end of second housing member 16, there is provided second support portion 16b supporting the first (right) end or third bearing support portion 7f of output shaft 7 through third bearing 19. Second housing member 16 further includes projecting portion 16c projecting radially outwards and enclosing the retainer assembly 21.

Figure 3:
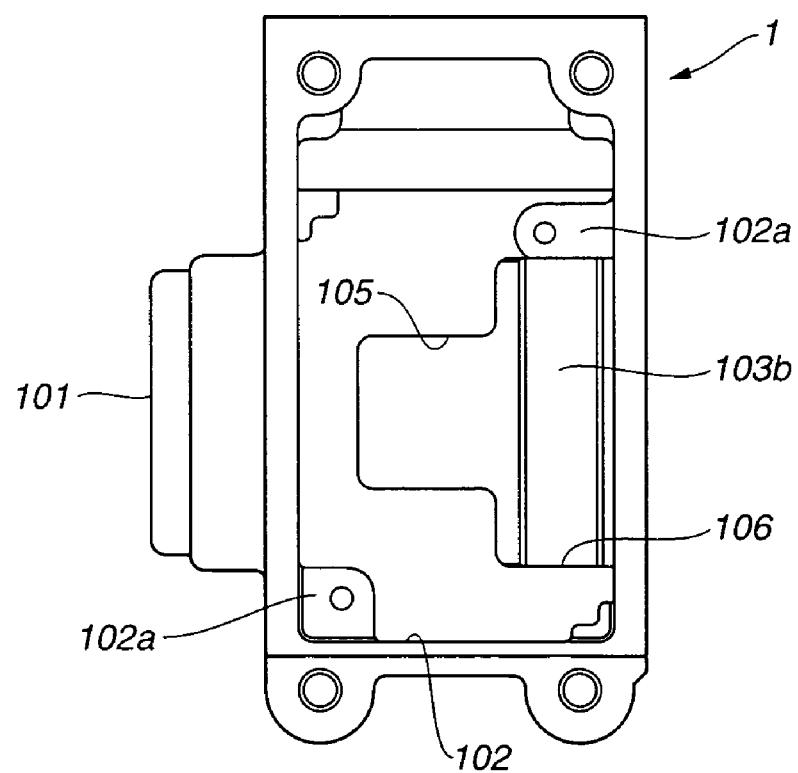
FIG. 3 is a plan view of a coil unit inserting opening formed in the first housing member of FIG. 2.

FIG. 2 shows first housing member or sensor housing 1 in cross section. FIG. 3 is a view of first housing member 1 as viewed from a position near the cover 26, from below in FIG. 1. First housing member 1 includes the cylindrical portion 121 defining the axial bore for receiving input shaft 6, and the projecting portion 122 projecting radially outwards from the cylindrical portion 121, as mentioned before. The axial bore formed in cylindrical portion 121 includes a first (left) bore portion 101 opening in the first (left) end of the cylindrical portion 121, a second (right) bore portion 103 opening in the second (right) end of the cylindrical portion 121, and a third (or middle) bore portion 104 formed axially between the first and second bore portions 101 and 103. In the assembled state of FIG. 1, input shaft 6 projects through first bore portion 101, and the second (left) end of output shaft 7 is received in second bore portion 103. The projecting portion 122 is formed with the before-mentioned cavity or insertion opening 102 extending radially into the axial bore of first housing member 1, and serving as an opening to insert each coil unit 2 into the axial bore. In the assembled state of FIG. 1, first housing member 1 is joined with second housing member 16, as mentioned before, and the axial bores of first and second housings 1 and 16 are aligned and connected continuously end to end with each other to form a single continuous axial bore.

In an assembly operation, input shaft 6 and output 7 are inserted into the axial bore of first housing member 1, from the second (right) open end 103 on the right side as viewed in FIG. 2. The first, second bore portions 101, 103 and 104 are coaxial with one anther, so that input and output shafts 6 and 7 are aligned coaxially in the housing composed of first and second housings 1 and 16.

The axial bore of first housing member 1 is in the form of a stepped cylinder so that the cross sectional size or diameter is increased stepwise from the first (left) end to the second (right) end, as shown in FIG. 2. First bore portion 101 includes a first cylindrical portion or dust seal support portion 101a, and a second cylindrical portion or first bearing support portion 101b which is greater in diameter than the first cylindrical portion 101a, and which is located on the right side of the first cylindrical portion 101a as viewed in FIG. 2. First housing portion 121 of first housing member 1 includes an annular shoulder surface 101c formed at the right end of the first bore portion 101, as viewed in FIG. 2. The annular shoulder surface 101c faces toward the second (right) end of the first housing portion 121, serves as a resilient member support portion, and defines the left end of the third bore portion 104. Second bore portion 103 includes a first cylindrical portion or second bearing support portion 103a formed at the second end of the axial bore, and a second cylindrical portion or holder retaining portion 103b which is formed on the left side of the first cylindrical portion 103a and which is smaller in diameter than the first cylindrical portion 103a, and greater in diameter than the third bore portion 104.

The second bearing 15 is disposed between first and second housing members 1 and 16 as shown in FIG. 1. One side (left side) of second bearing 15 is fit in the bearing support portion 103a of first housing member 1, and the other side (right side) of second bearing 15 is fit in the support portion 16a of the second housing member 16, as mentioned before. Second bearing 15 is clamped axially between an annular shoulder surface of the bearing support portion 103a of first housing member 1, and an annular shoulder surface of the bearing support portion 16a of second housing member 16.

The insertion opening 102 in projecting portion 122 of first housing member 1 opens downwards as viewed in FIG. 2, and the insertion opening 102 is adapted to allow insertion of each coil unit 2 radially into the axial bore of first housing member 1. Insertion opening 102 extends radially into the axial bore of first housing member 1. Projecting portion 122 of first housing member 1 includes a substrate support portion 102a formed in the insertion opening 102. The before-mentioned torque sensor substrate 5 is fixed to this substrate support portion 102a by at least one screw fastener.

Insertion opening 102 includes a coil unit inserting portion (or wide portion) 106 and a terminal holding portion (or narrow portion) 105 both extending radially into the axial bore of first housing member 1. Terminal holding portion 105 extends radially into the third (or middle) bore portion 104 which is adapted to hold coil units 2.

FIG. 3 shows the insertion opening 102 of first housing member 1 as viewed in a radial direction. The coil unit inserting portion 106 has an axial length approximately equal to an axial length of each coil unit 2, and a circumferential width (or radial width) greater than a circumferential width (or radial width) of the terminal holding portion 105. The radial width of terminal holding portion 105 is smaller than the radial width of each coil unit 2, and slightly greater than the radial width of the terminal portion 2d of each coil unit 2. The third (or middle) bore portion 104 is sized to contain two of the coil units 2. The coil unit inserting portion 106 is so sized to allow the insertion of each coil unit 2 axially into the axial bore of first housing through the coil unit inserting portion 106. The circumferential width of terminal holding portion 105 is so small that coil units 2 cannot be extracted radially from the middle bore portion 104 through terminal holding portion 105.

Figure 4A:
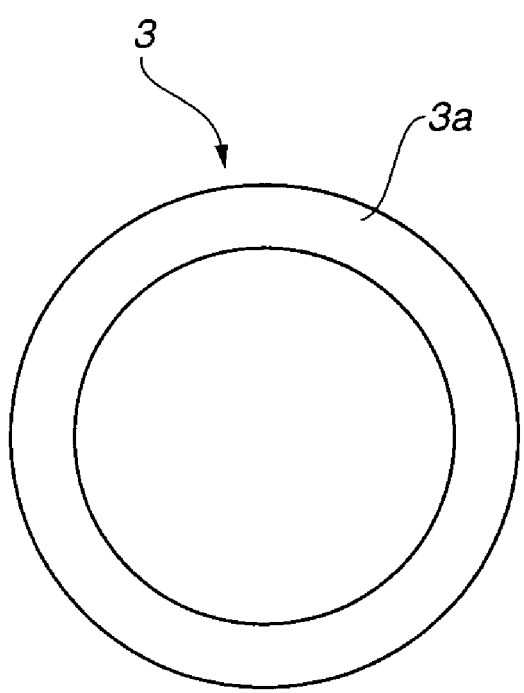
FIGS. 4A and 4B are front view and sectional view showing a cylindrical holder in the power steering apparatus of FIG. 1.
Figure 4B:
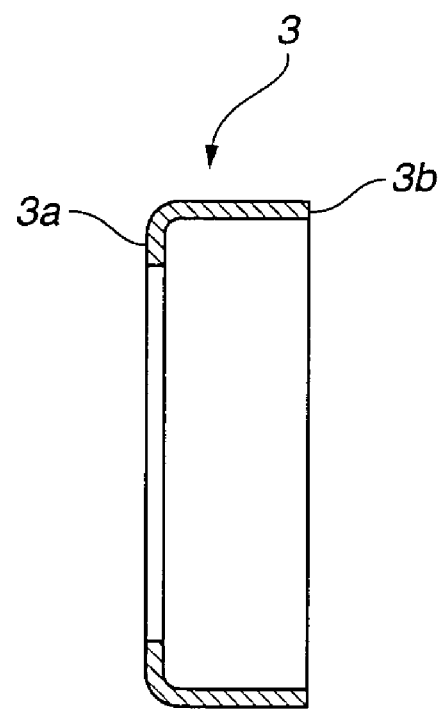

FIGS. 4A and 4B show the before-mentioned cylindrical holder 3. Holder 3 is cylindrical and has a L-shaped cross section as shown in FIG. 4B. Holder 3 extends axially from a first end 3a to a second end 3b. Holder 3 includes an annular flat portion or coil unit holding portion formed at the first end 3a, and a cylindrical portion extending axially from the outer circumference of the annular flat portion 3a, to the second end 3b, as shown in FIG. 4B.

As shown in FIGS. 1 and 4, holder 3 is fit in the holder retaining portion 103b, and placed axially between the coil units 2 and the second bearing 15. The annular flat portion 3a of cylindrical holder 3 abuts against the second (right) coil unit 2, and the second end 3b of holder 3 abuts against the second bearing 15. Holder 3 is press-fit in the holder retaining portion 103b with relatively weak force. Holder 3 is firmly pressed by the third bearing 15 toward the coil units 2. Therefore, holder 3 can hold the coil units 2 stationary.

Figure 5A:
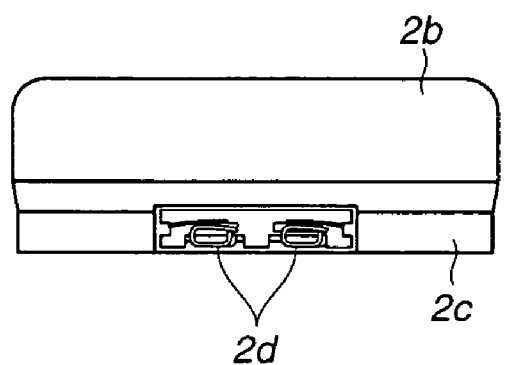
FIGS. 5A, 5B and 5C are side view, front view and sectional view showing a coil unit used in the power steering apparatus of FIG. 1.
Figure 5B:
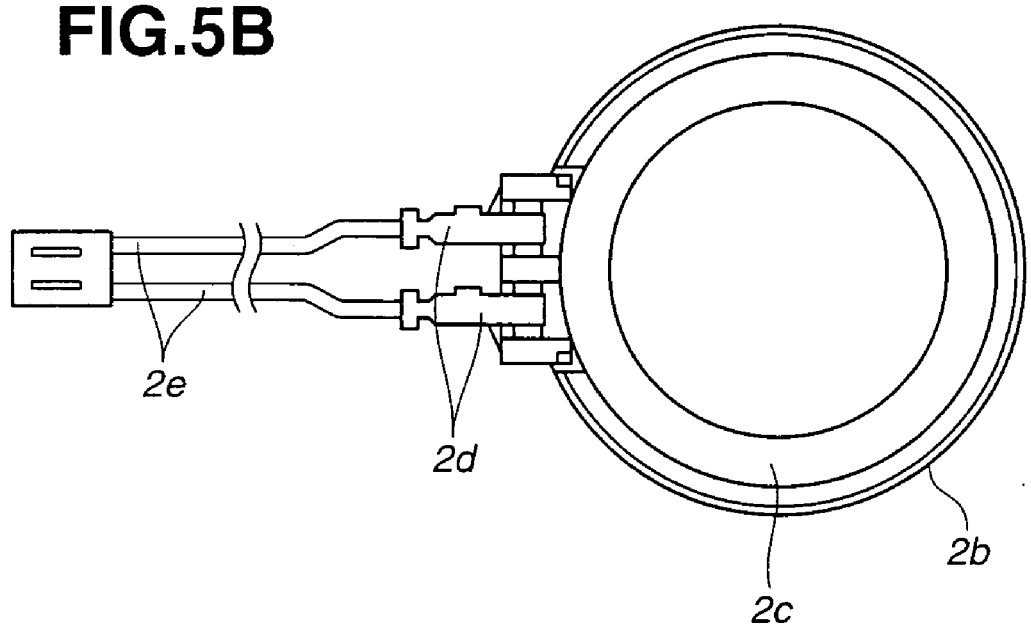
Figure 5C:
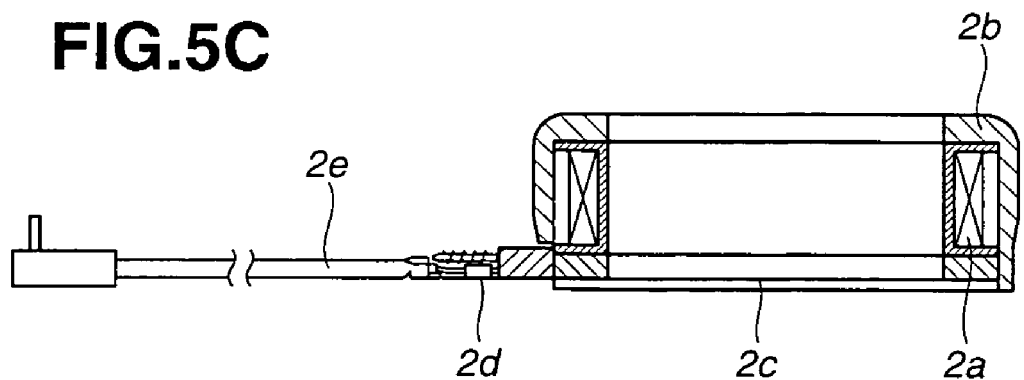

FIGS. 5A, 5B and 5C show one of the coil units 2. As shown in these figures, each coil unit 2 has a cylindrical portion including a coil 2a, a cylindrical casing 2b and a ring 2c. Coil 2a is enclosed by casing 2b and ring 2c. Coil 2a is annular and the inside circumference is sized to receive the outer ring 14 therein.

Terminal portion 2d of each coil unit 2 is connected with both ends of winding of the coil 2a. Terminal portion 2d projects radially outwards from one side portion of the cylindrical portion of each coil unit 2. The cylindrical portion of each coil unit 2 extends axially from a first end (upper end as viewed in FIG. 5C) to a second end (lower end in FIG. 5C) defined by the ring 2c. Terminal portion 2d projects radially from an end portion near the second end formed by ring 2c. Terminal portion 2d of each coil unit 2 is connected by a cable 2e, to the torque sensor substrate 5.

Figure 6:
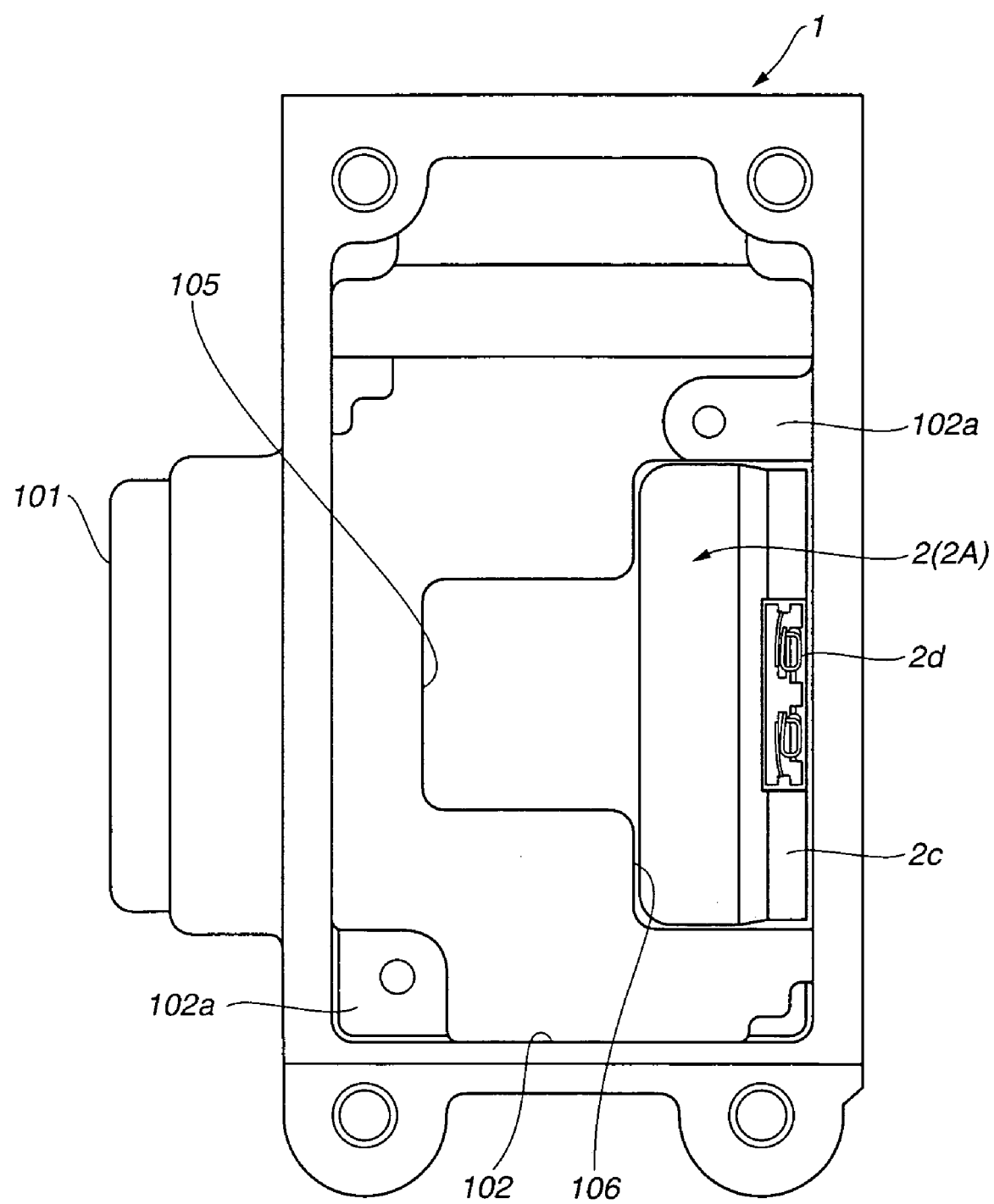
FIG. 6 is a plan view of the coil unit inserting opening of the power steering apparatus of FIG. 1 in the state in which one coil unit is inserted radially into the first housing member.

FIG. 6 illustrates an operation of inserting one of coil units 2 into the first housing member or sensor housing 1, from the insertion opening 102. The resilient member 4 and coil units 2 are inserted one after another radially into the axial bore of first housing member 1 from the radially extending insertion opening 102. Each of the coil units 2 is inserted in a radial direction perpendicular to the center axis of axial bore or the axis of input shaft 6.

The axial length of coil unit inserting portion 106 is approximately equal to the axial length of each coil unit 2. A first one (2A) of the two coil units 2 is inserted radially into the axial bore through the coil unit inserting portion 106. Thereafter, the first coil unit is moved axially (leftward in FIG. 6) within the axial bore, into the middle bore portion 104 to enable a next operation to insert a distance plate (or spacer) 28 and a second one (2B) of the two coil units 2 into the middle bore portion 104.

In the operation of moving the first coil unit 1A axially (leftward) into the middle bore portion 104, the projecting terminal portion 2d is inserted axially from the coil unit inserting portion 106 into the terminal holding portion 105. The first coil unit 2A is inserted into the axial bore in the state in which ring 2c faces rightward in FIG. 6, and the terminal portion 2d is held at an angular position confronting the terminal holding portion 105 as shown in FIG. 6. The terminal holding portion 105 receives the projecting terminal portion 2d and allows the coil unit 2A to move axially into the middle bore portion 104.

Figure 7:
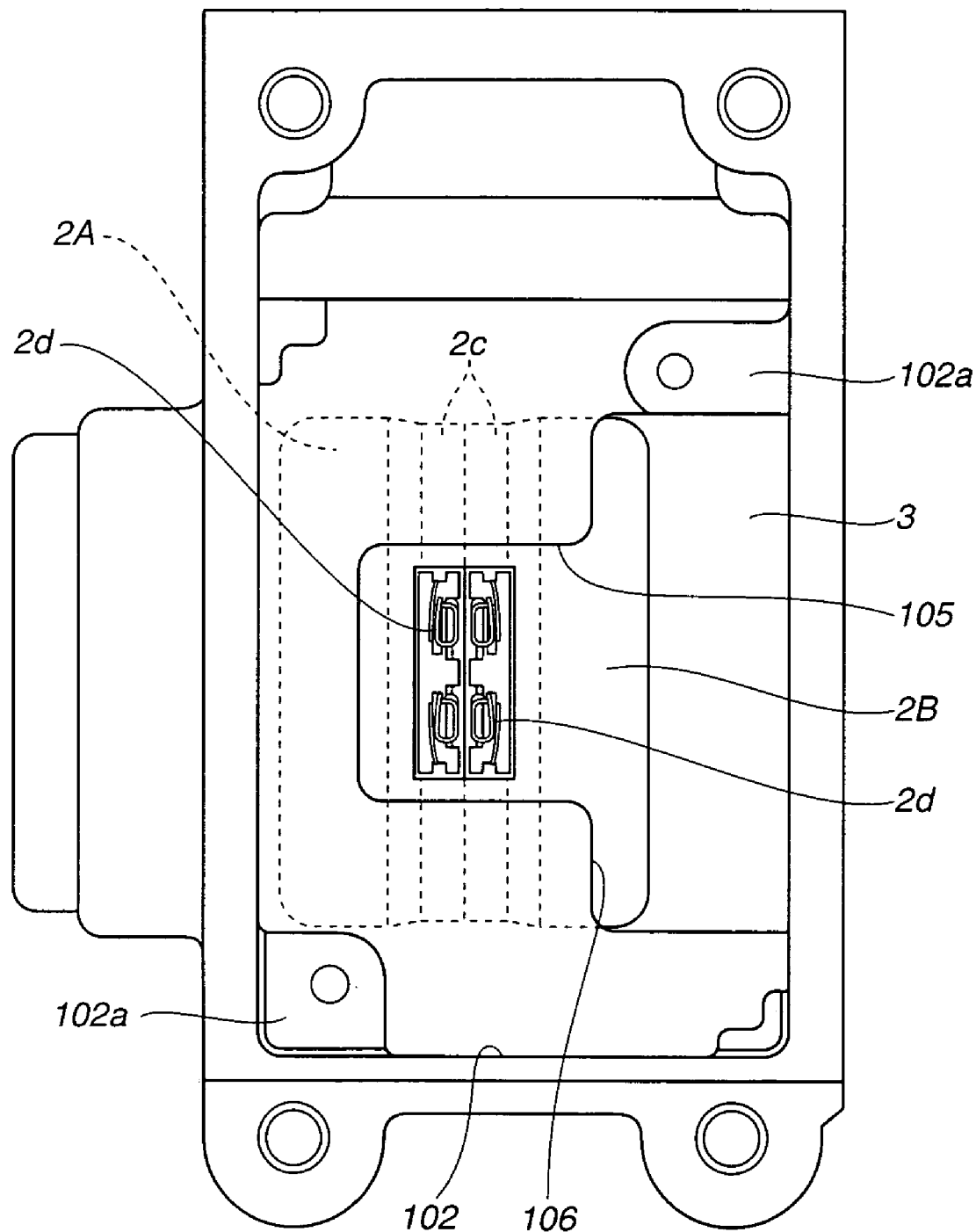
FIG. 7 is a plan view of the coil unit inserting opening of the power steering apparatus of FIG. 1 in the state in which two coil units are installed.

FIG. 7 shows the first and second coil units 2A and 2B installed in the middle bore portion 104 of first housing member 1 as viewed from the outside through the insertion opening 102. The first coil unit 1A is installed in the state in which the ring 2c provided with the terminal portion 2d faces rightward as mentioned before. After setting the first coil unit 2A in the middle bore portion 104, the distance plate 28 and the second coil unit 2B are inserted one after another into the first housing member 1 through the insertion portion 106. The second coil unit 2B is inserted radially into the axial bore through the coil unit inserting portion 106 in the state in which the ring 2c faces leftward, and then moved axially within the axial bore into the middle bore portion 104. In the state shown in FIG. 7, the rings 2c of first and second coil units 2A and 2B confront each other axially across distance plate 28. The terminal portions 2d of first and second coil units 2A and 2B extend radially outward substantially in parallel to each other from the respective rings 2c through the terminal holding portion 105. The terminal portions 2d are placed axially between the first ends (upper ends as viewed in FIG. 5C) of first and second coil units 2A and 2B. The first and second coil units 2A and 2C are arranged in a manner of bilateral symmetry as shown in FIG. 7.

After setting the second coil unit 2B in the middle bore portion 104, the holder 3 is inserted axially from the right side as viewed in FIGS. 1 and 2, and forcibly fit into the second bore portion 103. Holder 3 abuts against the second coil unit 2B to hold the first and second coil units 2A and 2B, and closes the bore portion 103. Coil units 2A and 2B and holder 3 close the terminal holding portion 105 and coil unit inserting portion 106.

In the thus-constructed sensor housing 1, one or more coil units are inserted radially into the axial bore of the housing as shown in FIG. 8B, whereas the coil unit inserting direction is axial in the housing of earlier technology, as shown in FIG. 8A. In the case of FIG. 8A, the inserting operation is troublesome because a coil unit has a projecting terminal portion. When the opening is increased to prevent interference with the projecting terminal portion, then the size of the housing is increased. Moreover, it is necessary to further form a radial hole in the housing for electrical connection between the terminal portion and an outside circuit.

By contrast, according to the embodiment of the present invention, the sensor housing 1 is formed with insertion opening 102 including coil unit inserting portion 106 and terminal holding portion 105, and substrate support portion 102a formed in the insertion opening 102. Therefore, the inserting operation becomes easier, and the axial open end of the housing need not be increased to avoid interference with the terminal portion. The radially extending insertion opening 102 is used for both of the insertion of coil units and the electrical connection of the coil units. This facilitates the process for producing the housing, and the assembly process.

In the case of FIG. 8A showing a related art, the opening has a radially projecting portion to avoid interference with the terminal portion of a coil unit. In this case, it is necessary to change the size and/or the shape of a gasket to be placed between the first and second housing members to be joined together to form the single housing. Moreover, it often becomes necessary to increase the size of a bearing to be placed between the first and second housing members. By contrast, as shown in FIG. 8B, the sensor housing 1 according to the embodiment is advantageous for the reduction in size of the housing, and the reduction of manufacturing cost, without need for increasing or changing the sizes and shapes of the opening, gasket and bearing. In the illustrated embodiment, the opening size of the bore portion 103 is so small that it is not possible to insert a coil unit having a radially projecting terminal portion axially from the bore portion 103. Moreover, the axial length of the coil unit inserting portion 106 is approximately equal to the axial length of one coil unit 2. Therefore, the axial length of sensor housing 1 is minimized. The axial length of the coil unit inserting portion 106 is smaller than the sum of the axial lengths of two coil units.

Figure 9:
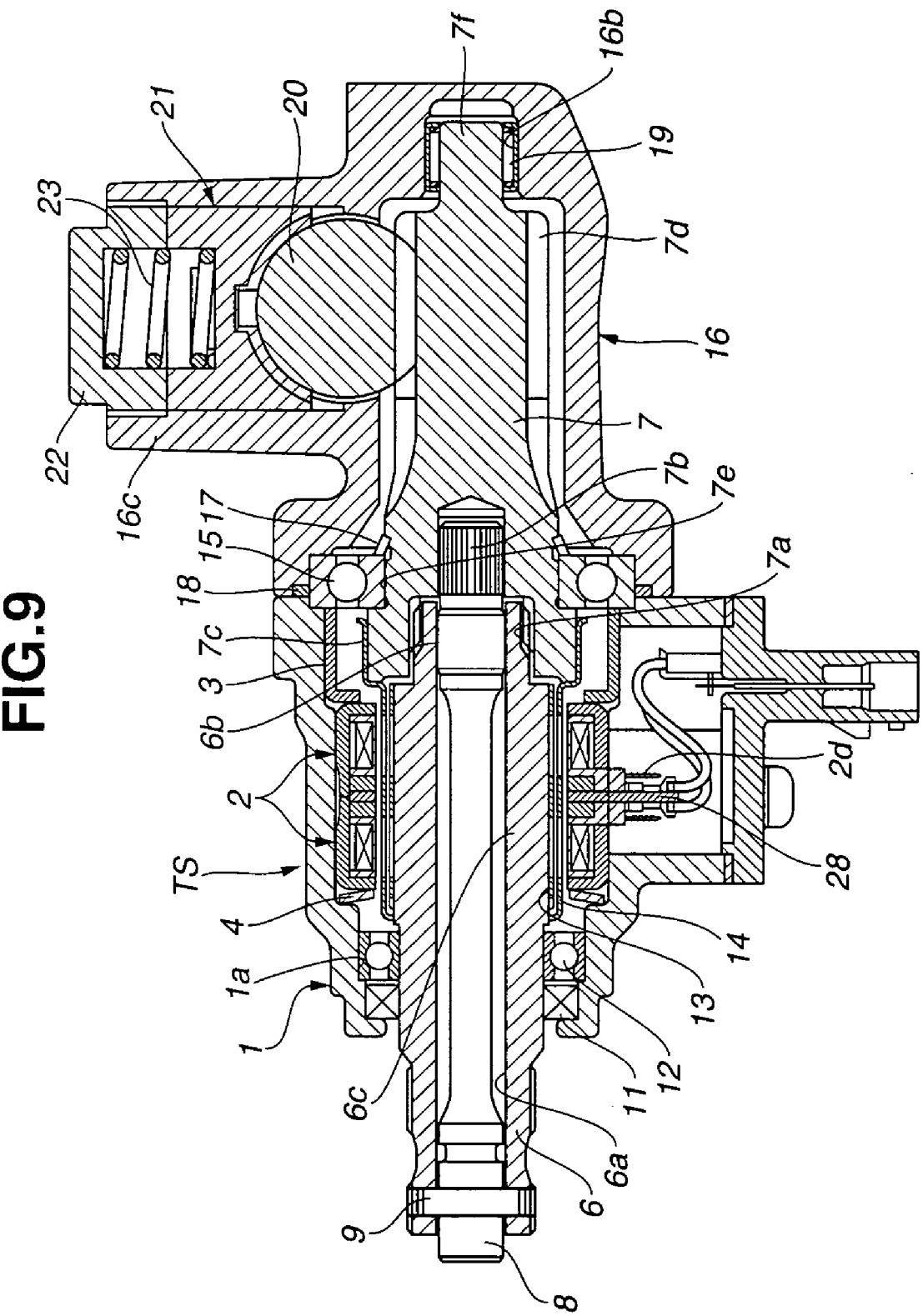
FIG. 9 is a sectional view showing an electric power steering apparatus according to a variation of the embodiment of the present invention.

FIG. 9 shows a variation of the first embodiment. In the power steering apparatus shown in FIG. 9, the torque sensor substrate 5 is placed outside the sensor housing 1.

In the illustrated embodiment, the first and second coil units are identical in shape and size, and arranged side by side in the axial direction. The axial length of the coil unit inserting portion 106 is slightly greater than the axial length of each coil unit and smaller than the sum of the axial lengths of the two coil units. Therefore, it is possible to decrease the axial dimension of housing.

The coil unit insertion portion 106 is sized to enable radial insertion of one coil unit, and has a circumferential width greater than the diameter of each coil unit. The terminal holding portion 105 extends axially and continuously from the circumferential middle of the coil unit inserting portion 106, and has a circumferential width smaller than that of the coil unit inserting portion 106. The terminal holding portion 105 can hold the terminal portion of each coil unit in the axial bore so as to prevent rotation of the coil unit in the axial bore of the housing.

The cylindrical holder 3 abuts axially against the coil units and prevents the axial movement of the coil units in the axial bore of the housing. The cylindrical holder 3 closes the coil unit inserting portion 106, and thereby prevent leakage of grease filled in the axial bore into the coil unit inserting portion.

The second bearing 15 is axially clamped between the first and second housing members 1 and 16. One side of the second bearing 15 is fit in the annular recess of the first housing member 1 and the other side of the second bearing 15 is fit in the annular recess formed in the second housing member 16. The shoulder surface of the annular recess of first housing member 1 faces rightward as viewed in FIG. 1 and abuts on the left side of second bearing 15. The shoulder surface of the annular recess of second housing member 16 faces leftward as viewed in FIG. 1 and abuts on the right side of second bearing 15. Thus, the second bearing 15 can be fixed in the axial direction reliably with no need for additional parts.

One axial end of the holder 3 abuts against the coil units, and the other axial end of holder 3 abuts against second bearing 15. The holder 3 can hold the coil units 2 fixed reliably in the axial bore in cooperation with the second bearing 15.

This application is based on a prior Japanese Patent Application No. 2004-063286 filed on Mar. 8, 2004. The entire contents of this Japanese Patent Application No. 2004-063286 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
   a rotational shaft including an input shaft, and an output shaft connected with the input shaft by a torsion bar;
   a coil unit including a coil surrounding the rotational shaft, and a terminal portion projecting radially outward from the coil to make electrical connection;

an impedance varying member to vary impedance of the coil in accordance with torque of the rotational shaft;

a torque sensing circuit connected with the terminal portion, to sense the torque of the rotational shaft in accordance with the impedance of the coil; and a housing containing the rotational shaft, the coil unit and the impedance varying member, and including an axial bore containing the rotational shaft, and an insertion opening which extends radially into the axial bore and which is sized to allow insertion of the coil unit radially through the insertion opening into the axial bore, the terminal portion of the coil unit being electrically connected with the torque sensing circuit through the insertion opening.

2. The power steering apparatus as claimed in claim 1, wherein, in addition to the coil unit which is a first coil unit, the power steering apparatus further comprises a second coil unit placed beside the first coil unit, in the axial bore of the housing; and the insertion opening of the housing includes a portion having an axial length substantially equal to an axial length of the first coil unit and to an axial length of the second coil unit.

3. The power steering apparatus as claimed in claim 1, wherein the insertion opening of the housing includes a wide portion having a circumferential length greater than a diameter of the coil unit, and a narrow portion which has a circumferential length smaller than the circumferential length of the wide portion, which extends axially and continuously into the wide portion, and which receives the terminal portion of the coil unit.

4. The power steering apparatus as claimed in claim 1, wherein the power steering apparatus further comprises a cylindrical holder which is placed in the axial bore of the housing, and which extends axially toward the coil unit to limit axial movement of the coil unit and to close at least part of the insertion opening of the housing.

5. The power steering apparatus as claimed in claim 1, wherein the housing includes a first housing member and a second housing member; and the power steering apparatus further comprises a bearing disposed between the first and second housing members and arranged to support the rotational shaft.

6. The power steering apparatus as claimed in claim 5, wherein the power steering apparatus further comprises a holder extending from a first end abutting on the coil unit, to a second end abutting on the bearing.

7. The power steering apparatus as claimed in claim 1, wherein the impedance varying member includes an inner ring provided on the input shaft of the rotational shaft, made of conductive and nonmagnetic material and formed with a plurality of windows arranged circumferentially, and an outer ring provided on the output shaft of the rotational shaft, made of conductive and nonmagnetic material and formed with a plurality of windows arranged circumferentially.

8. The power steering apparatus as claimed in claim 7, wherein each of the inner ring and the outer ring of the impedance varying member is made of aluminum material.

9. The power steering apparatus as claimed in claim 7, wherein the input and output rings are arranged to vary the impedance by varying a degree of overlap between the windows of the inner ring and the windows of the outer ring in accordance with the torque between the input and output shafts; and the torque sensing circuit is configured to sense the torque produced between the input shaft and the output shaft by sensing variation of the impedance.

10. The power steering apparatus as claimed in claim 1, wherein the input shaft is adapted to be connected with a steering wheel, the output shaft is adapted to be connected with a steering gear, and the power steering apparatus further comprises an actuator to produce a steering assist force in accordance with the torque sensed by the torque sensing circuit.

11. A power steering apparatus comprising:
a rotational shaft including an input shaft, and an output shaft connected with the input shaft by a torsion bar;

first and second coil units each including a coil surrounding the rotational shaft, and a terminal portion projecting radially outward from the coil to make electrical connection, the first and second coil units being arranged in an axial direction; and a housing including an axial bore containing the rotational shaft and the first and second coil units, and an insertion opening which extends radially into the axial bore, and which is sized to allow insertion of each coil unit radially through the insertion opening into the axial bore, the axial bore including first and second open ends each having a diameter which is smaller than a radial dimension of each coil unit including the terminal portion.

12. The power steering apparatus as claimed in claim 11, wherein the insertion opening of the housing includes a coil unit inserting portion sized to allow passage of each of the first and second coil units radially into the axial bore, the coil unit inserting portion has an axial length which is greater than an axial length of each of the first and second coil units and smaller than a sum of the axial lengths of the first and second coil units.

13. The power steering apparatus as claimed in claim 11, wherein the insertion opening of the housing further includes a terminal holding portion which has a circumferential length smaller than a circumferential length of the coil unit inserting portion, which extends axially and continuously into the coil unit inserting portion, and which receives the terminal portions of the first and second coil units.

14. The power steering apparatus as claimed in claim 11, wherein the first and second coil units are substantially identical to each other; each of the first and second coil units extends axially from a first end portion to a second end portion from which the terminal portion projects radially outward, and the second end portions of the first and second coil units axially confront each other in the axial bore of the housing.

15. A torque sensor comprising:
a rotational shaft including an input shaft, and an output shaft connected with the input shaft by a torsion bar;

a coil unit including a cylindrical portion including a coil surrounding the rotational shaft, and a terminal portion which projects radially outward from the cylindrical portion, a torque sensing section electrically connected with the coil through the terminal portion; and a housing including an axial bore containing the rotational shaft and the coil unit, and an insertion opening which extends radially into the axial bore and which is sized to allow insertion of the coil unit radially through the insertion opening into the axial bore.

16. The torque sensor as claimed in claim 15, wherein the housing includes a cylindrical portion defining the axial bore therein, and a projecting portion projecting radially outward from the cylindrical portion and defining the insertion opening extending radially into the axial bore.

17. The torque sensor as claimed in claim 15, wherein the housing comprises a first housing member extending axially from a first end to a second end, and a second housing member extending axially toward the second end of the first housing, from a first end to a second end joined with the second end of the first housing member, the first housing member includes the axial bore which extends axially from a first open end opened in the first end of the first housing member to a second open end opened in the second end of the first housing member, a cross sectional size of the axial bore in the first housing member is increased stepwise form the first open end to the second open end which is so sized that it is possible to insert the rotation shaft axially from the second open end into the axial bore.

18. The torque sensor as claimed in claim 15, wherein the axial bore of the housing extends axially from a first open end to a second open end, and each of the first and second open ends of the axial bore is so sized and shaped as not to allow axial insertion of the coil unit including the terminal portion into the axial bore.

* * * * *